United States Patent Office 3,828,058
Patented Aug. 6, 1974

3,828,058
PROCESS FOR THE MANUFACTURE OF 1,1'-DI-SUBSTITUTED-4,4'-BIPYRIDYLIUM SALTS
John Francis Cairns, John Edward Colchester, and John Hubert Entwisle, Runcorn, England, assignors to Imperial Chemical Industries Limited, London, England
No Drawing. Filed Mar. 27, 1969, Ser. No. 811,248
Claims priority, application Great Britain, Apr. 5, 1968, 16,474/68
Int. Cl. C07d 31/42
U.S. Cl. 260—296 D 14 Claims

ABSTRACT OF THE DISCLOSURE

A process for the manufacture of 1,1'-disubstituted-4,4'-bipyridylium salts which comprises treating the corresponding 1,1' - disubstituted - 1,1',4,4' - tetrahydro - 4,4'-bipyridyl with a salt of a metal capable of existing in at least two valency states wherein the metal is in a higher valency state and the redox potential of the metal salt in water between different valency states of the metal is more positive than —1.48 volts as compared with the saturated calomel electrode.

---

This invention relates to the manufacture of bipyridylium salts and related compounds, particularly bis-quaternary salts of 4,4'-bipyridyl which are useful herbicidal compounds.

According to the present invention there is provided a process for the manufacture of 1,1' - disubstituted - 4,4'-bipyridylium salts which comprises treating the corresponding 1,1' - disubstiuted - 1,1',4,4' - tetrahydro-4,4'-bipyridyl with a salt of a metal capable of existing in at least two valency states wherein the metal is in a higher valency state and the redox potential of the metal salt in water between different valency states of the metal is more positive than —1.48 volts as compared with the saturated calomel electrode.

The reaction can be conveniently carried out in the presence of an inert solvent, usually a solvent which will dissolve the disubstituted tetrahydrobipyridyl and preferably also the resulting bipyridylium salt. It is not necessary that the metal salt should dissolve completely in the solvent, although it will probably do so to a limited extent. Suitable solvents include ethers and thioethers for example diethyl ether, tetrahydrofuran, 1,2 - dimethoxyethane, bis- (2 - methoxy) ether, 1,4 - dioxane and thiophene; ketones, for example acetone, hydrocarbons, for example benzene, toluene, xylene and hexane; organic bases, for example pyridine; halogenated hydrocarbons, for example chlorobenzene, chloroform, carbon tetrachloride, methylene dichloride and trichloroethylene; amides, particularly tertiary alkylamides for example dimethyl formamide; sulphoxides, for example dimethyl sulphoxide; sulphones, for example sulpholane; carbon disulphide; and nitriles, for example acetonitrile. Although their use tends to lead to somewhat lower yields of bis-quaternary salts than can be obtained when the above-mentioned solvents are used the reaction may also be carried out in other solvents, for example in alcohols (including glycols) for example ethylene glycol, diethylene glycol, 2-(2-methoxy ethoxy) ethanol, methanol, ethanol and isopropanol. Mixtures of solvents may be used if desired.

The metal salt will usually be a salt of an inorganic acid, for example a metal chloride, sulphate, carbonate or nitrate. The metal salt may be in the hydrated form. Examples of suitable metal salts of this type are cobalt dichloride, cobalt nitrate, cobalt nitrate hexahydrate, cobalt sulphate heptahydrate, copper chloride, copper sulphate pentahydrate, ferric sulphate, lead nitrate and cerium sulphate. The metal salt may, however, be a salt of an organic acid for example acetic acid. It is to be understood that the term metal salt for the purposes of this specification includes metal complexes such as bis-N,N'-disalicylyl-ethylenediamine-$\mu$-aquodicobalt (II), commonly called salcomine. In addition, when the reaction is carried out in solution, the metal salt or the metal ions thereof may form a chemical complex with the solvent. Examples of solvents which may result in chemical complexes with the metal salt are cyanides, for example acetonitrile, and amides, for example formamide.

Tetrahydrobipyridyls which may be used in the process include those described in U.K. Patent Specification No. 1,073,081, for example tetrahydrobipyridyls which carry alkyl or carbamidoalkyl, and particularly methyl or N,N-disubstituted carbamidomethyl substituents on the nitrogen atoms. Other suitable tetrahydrobipyridyls are those having inert substituents, for example alkyl groups, on the carbon atoms of the pyridine nuclei.

As stated hereinbefore the tetrahydrobipyridyl will usually be treated with the metal salt in the presence of an inert solvent, and in this case the concentration of the tetrahydrobipyridyl can be conveniently about 0.4 (0.25 to 0.5) mole per litre and the concentration of the metal salt can be about 1, and may be up to say 5, moles per litre. The metal salt can be added directly to a stirred solution of the tetrahydrobipyridyl to form a dispersion therein, or it may be added as a preformed dispersion either in water or in an inert solvent which advantageously can be the same as the solvent in which the tetrahydrobipyridyl is dissolved.

The optimum temperatures for carrying out the process of the invention can be established by simple experiment and depends upon the particular tetrahydrobipyridyl and solvent used. In general, we have found that temperatures of from —50° C. to 200° C. may be used, preferably from 0° C. to 150° C. and especially from about 30° C. (room temperature) to 100° C. The optimum reaction time may vary within wide limits but can be found by simple experiment.

The interaction of the 1,1'-disubstituted tetrahydrobipyridyl with the metal salt oxidising agent, usually produces a product of indefinite composition which may be converted into the 1,1' - disubstituted - 4,4' - bipyridylium salt by treatment with an acid, particularly a mineral acid for example hydrochloric, sulphuric, or phosphoric acid, though organic acids may be used, for example acetic acid.

For this acid treatment, temperature is not a very critical factor and a wide range of temperatures may be used. The acid treatment produces the bipyridylium salt and the reduced form of the oxidising agent for example a metal salt wherein the metal is in a lower valency state than it was initially. This salt can be removed from the reaction mixture containing the bipyridylium salt by filtration.

The 1,1'-disubstituted bipyridylium salt can be recovered from the reaction mixture by conventional processes, for example by extraction of the mixture with water or a dilute solution of an acid such as sulphuric, hydrochloric, phosphoric or acetic acid. The bipyridylium salt may then be recovered from the aqueous phase by evaporation of the water and crystallisation of the salt.

The invention is illustrated but in no way limited by the following examples.

EXAMPLES 1 TO 5

A solution (10 mls.) of 1,1'-dimethyl-1,1',4,4'-tetrahydro-4,4'-bipyridyl in benzene prepared under nitrogen from methyl pyridinium chloride was added dropwise to a stirred suspension of ferric sulphate ($Fe_2(SO_4)_3 \cdot 9H_2O$) (2.3 gms.) in chloroform (10 mls.) under an atmosphere of nitrogen. After 1 hour the mixture was poured with stirring into dilute hydrochloric acid (150 mls.) under nitrogen, after which air was blown through the mixture.

The mixture was allowed to separate into two phases, and the resulting aqueous layer was removed and analysed colorimetrically. The analysis indicate that the product was 1,1'-dimethyl-4,4'-bipyridylium dichloride and the reaction efficiency was 21% based on the methyl pyridinium chloride starting material.

The above procedure was repeated (Examples 2 to 5) using various metal salts and the results are shown in the table below:

TABLE

| Example number | Metal salt | Reaction efficiency (percent) |
|---|---|---|
| 1 | $Fe_2(SO_4)_3 \cdot 9H_2O$ | 21 |
| 2 | $Ce(SO_4) \cdot 4H_2O$ | 22 |
| 3 | $CuSO_4 \cdot 5H_2O$ | 16 |
| 4 | $CoCl_2$ | 14 |
| 5 | $CoSO_4 \cdot 7H_2O$ | 13 |

NOTE.—Reaction efficiencies are based on tetrahydrobipyridyl fed.

What we claim is:

1. A process for the manufacture of 1,1'-lower alkyl and carbamido(lower alkyl) disubstituted-4,4'-bipyridylium salts which comprises treating in an inert solvent at temperatures between −50° and 200° C. the corresponding 1,1' - disubstituted - 1,1',4,4' - tetrahydro-4,4'-bipyridyl with a salt of a metal capable of existing in at least two valency states wherein the metal is in a higher valency state and the redox potential of the metal is more positive than −1.48 volts as compared with the saturated calomel electrode.

2. A process as claimed in claim 1 wherein the treatment is carried out in the presence of an inert solvent for the tetrahydrobipyridyl.

3. A process as claimed in claim 2 wherein a water-immiscible solvent is used.

4. A process as claimed in claim 2 wherein an organic solvent is employed.

5. A process as claimed in claim 1 wherein the temperature is from 30° C. to 100° C.

6. A process as claimed in claim 2 wherein a solvent is present and the concentration of the tetrahydrobipyridyl is from 0.25 to 0.5 mole per litre.

7. A process as claimed in claim 6 wherein the concentration of the metal salt is from 1 to 5 moles per litre.

8. A process as claimed in claim 1 wherein the metal salt is used in the form of a solution or dispersion in an inert solvent.

9. A process as claimed in claim 1 wherein the metal salt is a salt of an inorganic acid.

10. A process as claimed in claim 1 wherein the metal salt is a metal complex salt.

11. A process as claimed in claim 1 wherein a solvent is present and the metal salt forms a complex salt with the solvent.

12. A process as claimed in claim 1 wherein a hydrated metal salt is employed.

13. A process as claimed in claim 1 wherein the alkyl groups are methyl groups.

14. A process as claimed in claim 1 wherein the 1,1'-substituents of the tetrahydrobipyridyl are carbamidomethyl groups.

References Cited

Raphael et al., Advances in Organic Chemistry: Methods and Results, Interscience, vol. 5, pp. 6–7 (1965).

ALAN L. ROTMAN, Primary Examiner